April 5, 1949.
G. E. BALL ET AL
2,466,297
DEHYDRATING APPARATUS
Filed March 23, 1945
3 Sheets-Sheet 1
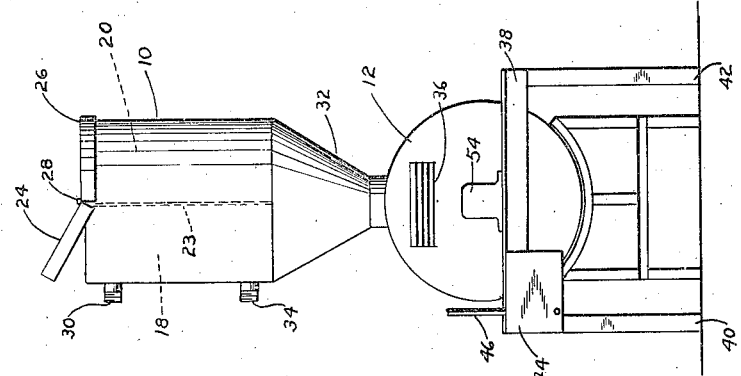
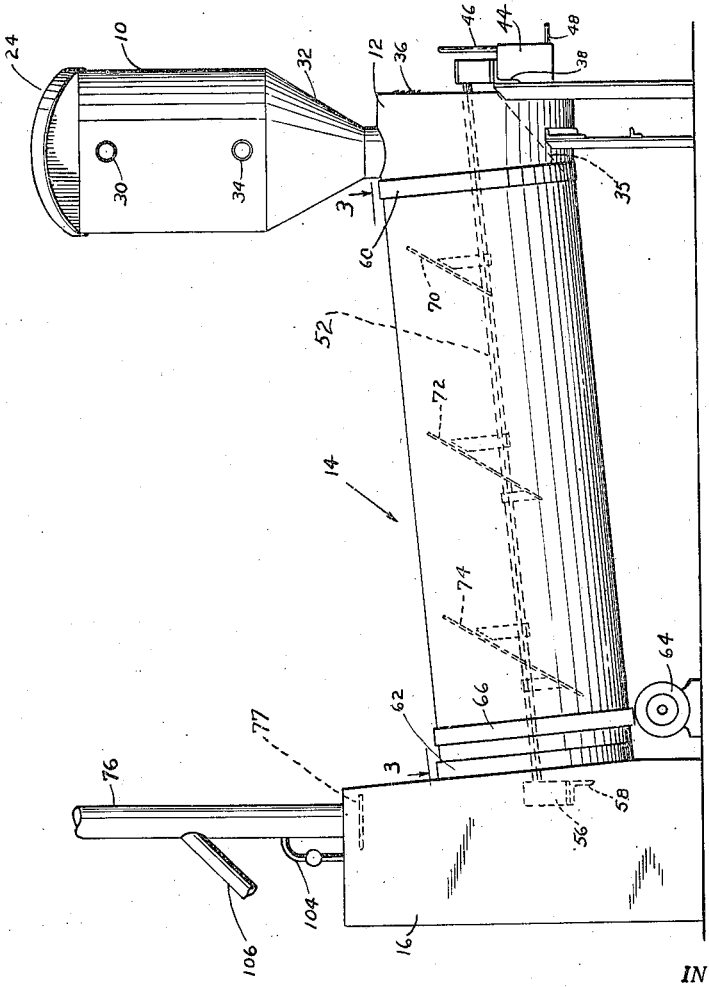
INVENTOR.
GEORGE EDWARD BALL
& OTIS W. BARRETT
BY
ATTORNEY

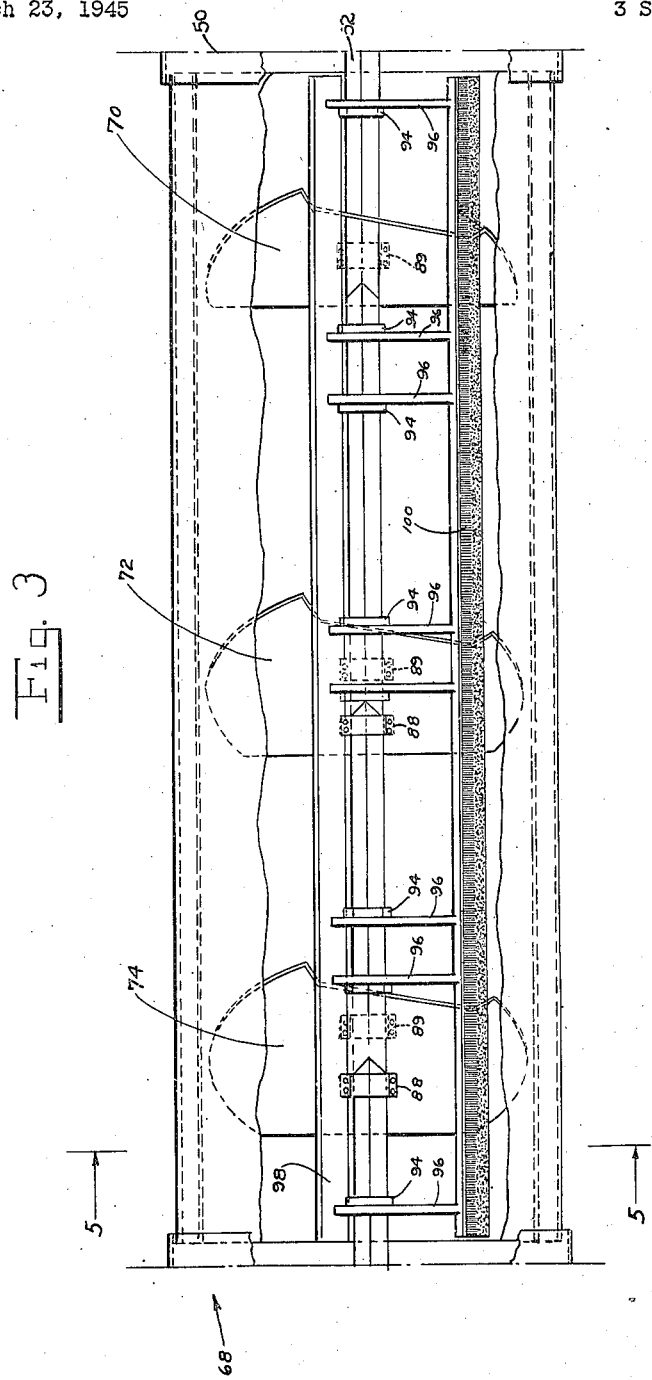

April 5, 1949.  G. E. BALL ET AL  2,466,297
DEHYDRATING APPARATUS

Filed March 23, 1945  3 Sheets-Sheet 3

INVENTOR.
GEORGE EDWARD BALL
& OTIS W. BARRETT
BY Irving F. Goodfriend
ATTORNEY

Patented Apr. 5, 1949

2,466,297

UNITED STATES PATENT OFFICE 2,466,297

DEHYDRATING APPARATUS

George Edward Ball, Cranston, R. I., and Otis W. Barrett, New York, N. Y.

Application March 23, 1945, Serial No. 584,404

2 Claims. (Cl. 99—246)

The present invention relates to a dehydrator for foods, particularly to that type referred to as animal and poultry feeds, and to a method of dehydrating the same.

Our invention contemplates the provision of apparatus by means of which, at relatively low cost of operation, there may be produced dehydrated foods, which are of particular use to enrich the feeds given to cattle and poultry, and which dehydrated foods retain a high proportion of the proteins and the minerals of the raw materials, the apparatus controllable so that if desired, the vitamin content of the raw materials may also be retained.

Our invention still further contemplates the provision of an apparatus which by suitable variation of its dimensions and the regulation of its operative speeds and temperatures is applicable to the dehydration of a large variety of food and feed materials.

These, other and further objects, advantages and uses of the present invention will be clear from the following description and the drawings in which our apparatus is schematically shown and in which drawings Fig. 1 is a side elevation of an apparatus according to our invention Fig. 2 is an end view thereof Fig. 3 is a view on the line 3—3 of Fig. 1

Figure 4:
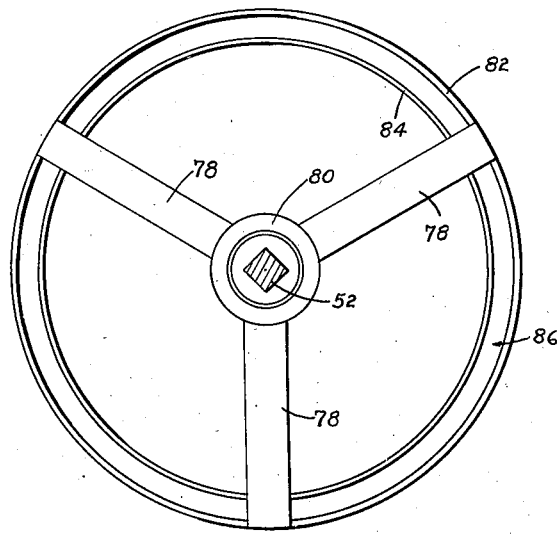
Fig. 4 is a view on the line 4—4 of Fig. 3

In the drawings, we have shown by way of illustration a dehydrating apparatus according to our invention, which is to be used particularly for the dehydration of fish and fish waste, including the viscera, to a condition in which, when suitably ground, it may be used for the enrichment of feeds for poultry and cattle.

Referring now to Fig. 1, our apparatus broadly includes a hopper 10, which may constitute a pre-conditioning or pre-treating chamber, from which the material is fed, preferably through the inlet chamber 12, to the rotating drum, generally indicated by the reference character 14, to be delivered therefrom to a collection chamber 16.

The delivery hopper 10, where a single hopper is used, is preferably divided into two compartments 18 and 20 by the separating wall 23, and is provided with covers 24 and 26, arranged on the hinge 28 for opening and closing, which covers are opened to charge the hopper with the food that is to be dehydrated in the apparatus.

In the dehydration of fish, it is an advantage and an economy in processing to first coagulate the albuminoids. To accomplish this the fish and fish offal, chopped to a convenient size, are charged into the hopper 10, where they are quick steamed under nominal pressure, approximately twenty-five pounds, more or less, by the introduction of steam into the hopper 10 through the steam pipe 30.

This quick steaming operation is accomplished immediately before the material is permitted to fall by gravity preferably through a throat 32 and the inlet chamber 12 from which it is fed into the rotating drum.

For removal of any water of condensation from the hopper 10, we provide at the lower part thereof a drain 34. It will, of course, be understood that the steam inlet pipe 30 and drain 34 are provided with conventional valves and that their location as shown in the drawing is for purposes of illustration since it may be changed in practice.

The material to be processed is directed, as it falls, from the hopper 10 into the drum 14 by a chute 35, mounted in the inlet chamber 12, the rate at which it is fed into the drum regulated by conventional means which therefore need not be shown.

Air is admitted at the inlet chamber 12 through the louvers 36 and is circulated through the apparatus by means which will be described.

The air drawn into the apparatus is heated by the burner 44 (schematically shown) mounted in the inlet chamber 12 and carried on the cross beam 38 supported by the legs 40 and 42. The fuel used is preferably oil or gas, though it will be understood that any type of heating means may be arranged in or under the chamber 12 to heat the air before it is circulated through our apparatus. Conventional valves (not shown) are arranged in the fuel and air lines 46 and 48 so that the burner 44 may be regulated to control the temperature of the air that is circulated through the apparatus, the volume of air admitted controlled by the louvers 36. Thus the volume and temperature of the air circulated through our apparatus may be regulated to meet any operating condition.

The drum 14 is supported at a moderate angle to the horizontal in the apparatus (downwardly tilted from the entrance 50) on the stationary shaft 52, which for purposes of carrying the divers elements in the drum is preferably square in section. The shaft 52 is supported at one end in the carrying box or saddle block 54, mounted on the cross beam 38 and at the other end in the box or saddle block 56, mounted on the angle support 58 carried in the collection chamber 16.

The drum is rotated by any satisfactory means, for example, the motor 64 engaging a rack 66 on the outside of the drum 14. Whatever driving means is used, it is preferably variable in speed so that the rate of revolution of the drum may be controlled.

As the drum rotates, the material in process therein is lifted until it attains a slope at which it can no longer support itself whereupon it falls downward. There is thus caused a constant crumbling of the surface of the mass whereby the loosened particles roll downward in a generally vertical direction and by reason of the axial inclination of the drum are caused to gradually travel axially of the drum from its inlet to its outlet.

This crumbling, rolling and falling action of the particles serves to mix up the mass and constantly expose fresh surfaces to the moisture extracting or drying effect of the current of air circulating through the drum.

On completion of its travel through the drum 14 from the entrance 50 to the outlet 68 (Fig. 3), the now substantially dehydrated material falls by gravity into the collection chamber 16, from which it may be manually removed through a suitable door or automatically by conventional conveyor means (not shown).

The rate at which the fish or other material travels through the rotating drum 14 is dependent, among other things, upon the angle to the horizontal at which the drum is arranged in the apparatus and its speed of rotation, which latter may be selectively varied as stated.

The air is drawn into the apparatus through the louvers, heated to a controlled temperature to meet different requirements, circulated through the drum from the upper part of the inlet 50 thereto and together with the moisture extracted from the material exhausted from the exhaust duct 76, extending from the chamber 16, by means of an exhaust or induced draft fan mounted in the duct (which fan is conventional and so not shown).

The heated air, as it is circulated through the drum, is constantly directed by the deflector plates 70, 72 and 74 toward the lower parts of the drum in which the chopped fish or other material, already heated by the quick steaming, is being tumbled and rolled about as it moves through the drum by gravity. There is thus constantly exposed a maximum of fresh surfaces of the pieces of the material to the impact of the stream of hot air, which removes the moisture and thus dries the material.

The deflector plates 70, 72 and 74 preferably vary in size uniformly from the smallest plate 70, adjacent the entrance to the drum, to the largest in size (74), adjacent the discharge end of the drum, the intermediate plate 72 being medium in size. The plates are arranged at an angle to the vertical transversely of the axial direction of the drum so that as the heated air is drawn through the drum 14, it is directed down toward the lower portion of the drum where the material in process is being tumbled and rolled by the rotative movement of the drum.

It will of course be recognized that exhausting the air through the duct 76 effects a partial vacuum in the drum, which, though slight, aids to some extent the escape of the moisture from the fish or other material.

Some lighter particles of dehydrated material may be drawn into the duct 76, along with the air that is exhausted from the drum and so would thereby become lost. In order to avoid this, we mount near the entrance to the duct 76, a baffle plate 77 arranged to deflect these lighter particles and screen them from the duct.

The drum is supported at each end thereof on the shaft 52 (Fig. 4) by means of the spider arms 78 extending from the bearings 80 (on which bearings the drum is also mounted for rotation) to the outer shell 82 and inner shell 84, which shells are spaced from each other to form the air passage 86, the purpose of which will be further explained.

Figure 5:
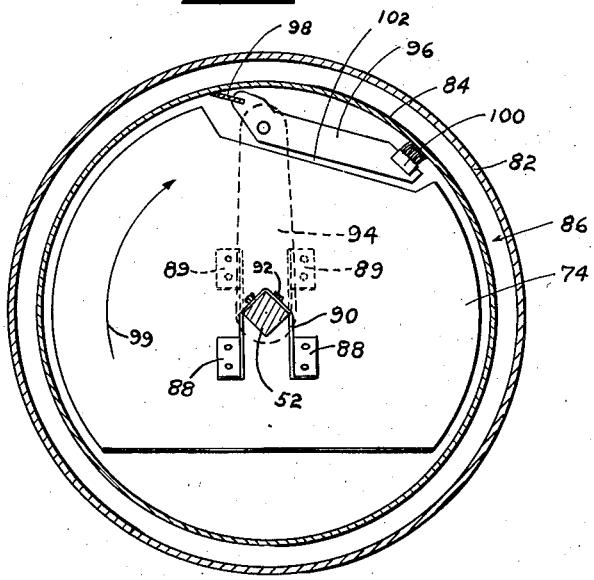
Fig. 5 is a section on the line 5—5 of Fig. 3.

To support the deflecting plates in position on the shaft, we rivet thereto the angle plates 88 and 89 which are in turn riveted to the legs of the bracket 90 mounted on the shaft 52 by the bolts 92 (Fig. 5).

On completing its travel through the drum, the dehydrated material is discharged therefrom in a steady stream and falls into the collection chamber 16 from which, as stated, it is removed, either by hand or automatically on a conveyor means. It is allowed to cool and when sufficiently cool it may be ground to uniform fineness in a hammer mill of the conventional type.

Most fish material is sticky and so will adhere or cling, often very tenaciously, to the surface with which it has been brought into contact. In order to remove from the surface of the drum any material that may adhere thereto, we provide a scraper means which serves to wipe away, as the drum rotates, any material that may cling thereto, which then falls to the bottom of the drum through the current of air, where it mingles with the larger mass of the material being processed through the apparatus.

Secured on the shaft and spaced therealong, we provide the scraper means carrying arms 94 to which the mounting members 96 are riveted.

Arranged in these mounting members, which are spaced on the shaft 52, and parallel to the axis along the inner periphery of the drum and in contact with the inner surface of the shell 84 at the top thereof, we mount the scraper knife 98 which scrapes off any clinging material as the drum is rotated past the knife edge in the direction indicated by the arrow 99 (Fig. 5).

In order to insure that the scraper knife 98 will always be in operative engagement with the inner surface of the drum, it is preferably mounted so that it is yieldingly tensioned thereagainst.

To remove some of the finer particles clinging to the surface of the drum, that may not be removed by the scraper means and which, if allowed to continue to adhere thereto would become excessively dry and might discolor the dehydrated product to a sufficient degree to be somewhat detrimental to its appearance, we mount in the members 96 at the rear thereof a stiff wire brush 100 which extends throughout the drum axially thereof. The rotation of the drum against this brush serves to insure that the inner surface of the drum will be cleaned of any clinging particles.

The deflecting plates are cut away, as at 102 so that the brush and knife may extend uninterruptedly therepast. These members are preferably made in sections so that they may be easily assembled in position in the drum.

We have illustrated a preferred form of drum, which is provided with an outer shell 82 and an inner shell 84, which shells are spaced from each other to provide the passage 86 through which the heated air is also drawn by the exhaust or induced draft fan. This construction keeps heated the inner shell 84 on the bottom of which the material being processed is carried so that the material is uniformly heated throughout its mass. It will of course be understood that this construction is not essential to the functioning of our process, but where operation is continuous, the relatively higher efficiency obtained thereby justifies its higher cost.

Our dehydrating apparatus may be located in a section where the odor, attendant upon the processing of fish material, may be considered objectionable. In order to deodorize the air discharged from our apparatus through the duct 76 to a tolerable degree, we preferably provide a flame area through which odor bearing air, discharged from our apparatus, is passed.

This flame area is formed by the burner 104 in the duct 76, using a suitable fuel, such as oil or gas, and supply the secondary air that may be required therefor through the duct 106.

While we have shown and described a specific example of our invention, it will be understood that this is illustrative only and is not given as a limitation since other modifications within the spirit and scope of the invention will be apparent to those skilled in the art.

Hence, we do not intend to be limited thereto but intend to claim our invention as broadly as may be permitted by the state of the prior art and the terms of the appended claims.

We claim:

1. In a dehydrating apparatus of the character described, a delivery chamber, a collection chamber, a rotatable drum supported for rotation and at an angle between said chambers and connecting said chambers, the drum where it is connected to the delivery chamber being higher than where it is connected to the collection chamber, means for rotating the drum at a selected speed, a hopper connected to the delivery chamber for charging the apparatus with material to be dehydrated, means for generating and circulating a current of heated air through the apparatus including means for regulating the quantity and the temperature thereof, deflector plates in the drum and spaced axially thereof to direct the current of air downwardly toward the lower part of the drum, said deflector plates arranged along the axis of the drum uniformly from adjacent the entrance to the drum to adjacent the discharge from the drum and varying uniformly in size from the entrance to the discharge of the drum, the smallest deflector plate being arranged adjacent the entrance to the drum and the largest deflector plate arranged adjacent to the exit from the drum, the area of each plate above the axis of the drum being equal, and means at the collecting chamber for exhausting the air circulated through the apparatus.

2. In a dehydrating apparatus of the character described, a drum arranged for rotation therein and at an angle to the horizontal, the entrance to the drum being higher than the exit thereto, a chamber for directing the material to be dehydrated into the drum, a shaft extending axially of the drum from the entrance thereto to the exit thereof, a plurality of deflector plates uniformly spaced along the shaft at an angle thereto whereby the upper part of the plates above the axis incline toward the entrance and the lower part of the plates incline toward the discharge, the area of each plate above the axis being equal and the area of each plate below the axis being uniformly larger in progression from the smallest plate at the entrance to the drum to the largest plate at the exit from the drum, a chamber for collecting the material discharged from the drum and means for generating and circulating a current of heated air through the apparatus.

GEORGE EDWARD BALL.
OTIS W. BARRETT.

REFERENCES CITED

The following references are of record in the file of this patent:

UNITED STATES PATENTS

| Number | Name | Date |
|---|---|---|
| 708,604 | Welch | Sept. 9, 1902 |
| 937,172 | Pearson | Oct. 19, 1909 |
| 1,047,760 | Davidson | Dec. 17, 1912 |
| 1,173,930 | Clark | Feb. 29, 1916 |
| 1,423,810 | Mellott | July 25, 1922 |
| 1,779,453 | Taylor | Oct. 28, 1930 |
| 2,350,209 | Clark et al. | May 30, 1944 |